United States Patent [19]
Olsen

[11] Patent Number: 5,370,916
[45] Date of Patent: Dec. 6, 1994

[54] TAPE DISPENSING SYSTEM

[76] Inventor: Joseph C. Olsen, 1560 Murre La., Sunnyvale, Calif. 94087

[21] Appl. No.: 877,867

[22] Filed: May 4, 1992

[51] Int. Cl.⁵ .......................... B65H 35/10; C09J 7/02
[52] U.S. Cl. ...................................... 428/40; 206/411; 225/16; 225/17; 225/18; 225/24; 225/56; 225/57; 225/91; 428/195; 428/220; 428/354; 428/356; 428/906
[58] Field of Search .................. 428/40, 343, 354, 356, 428/195, 200, 220, 906; 206/411; 225/56, 91, 17, 16, 24, 18, 57

[56] References Cited
U.S. PATENT DOCUMENTS

| | | | |
|---|---|---|---|
| 2,796,110 | 6/1957 | Dahlberg | 225/56 |
| 4,599,265 | 7/1986 | Esmay | 428/906 |
| 4,826,712 | 5/1989 | Theno | 428/906 |
| 5,193,106 | 3/1993 | Desena | 378/163 |

FOREIGN PATENT DOCUMENTS

| | | | |
|---|---|---|---|
| 2800939 | 8/1978 | Germany | 428/906 |
| 2909276 | 9/1980 | Germany | 428/906 |
| 13306 | 5/1975 | Japan | 428/906 |
| 2198369 | 6/1988 | United Kingdom | 428/906 |

Primary Examiner—Ellis P. Robinson
Assistant Examiner—Nasser Ahmad
Attorney, Agent, or Firm—Fliesler, Dubb, Meyer & Lovejoy

[57] ABSTRACT

The invention provides a longitudinally extending adhesive tape product adapted to be cut off into a plurality of tape segments by use of a transverse cutting edge. The product comprises a longitudinally extending tape wound into a roll, the tape having a first side which is adhesive free, a plurality of longitudinally separated indicia and a second side which has a corresponding plurality of longitudinally separated and transversely extending coating bands of pressure sensitive adhesive. The coating bands have leading and trailing edges and are separated by portions of the second side of the tape which are substantially adhesive free. The indicia are so located relative to the coating bands whereby when one of the indicia is aligned in a specified relation to the cutting edge and a tape segment is cut off, the cut off tape segment has a single one of the coating bands and the coating band on the cut off tape segment is located adjacent a transverse edge of the tape segment. A method is also set forth of cutting off such tape segments.

7 Claims, 3 Drawing Sheets

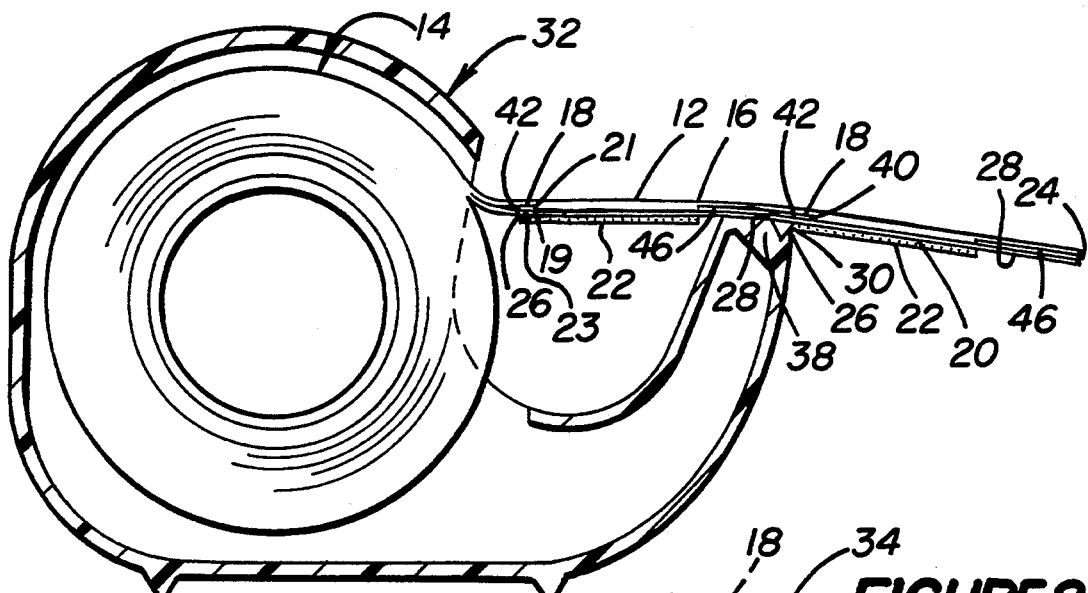
FIGURE 1
FIGURE 2
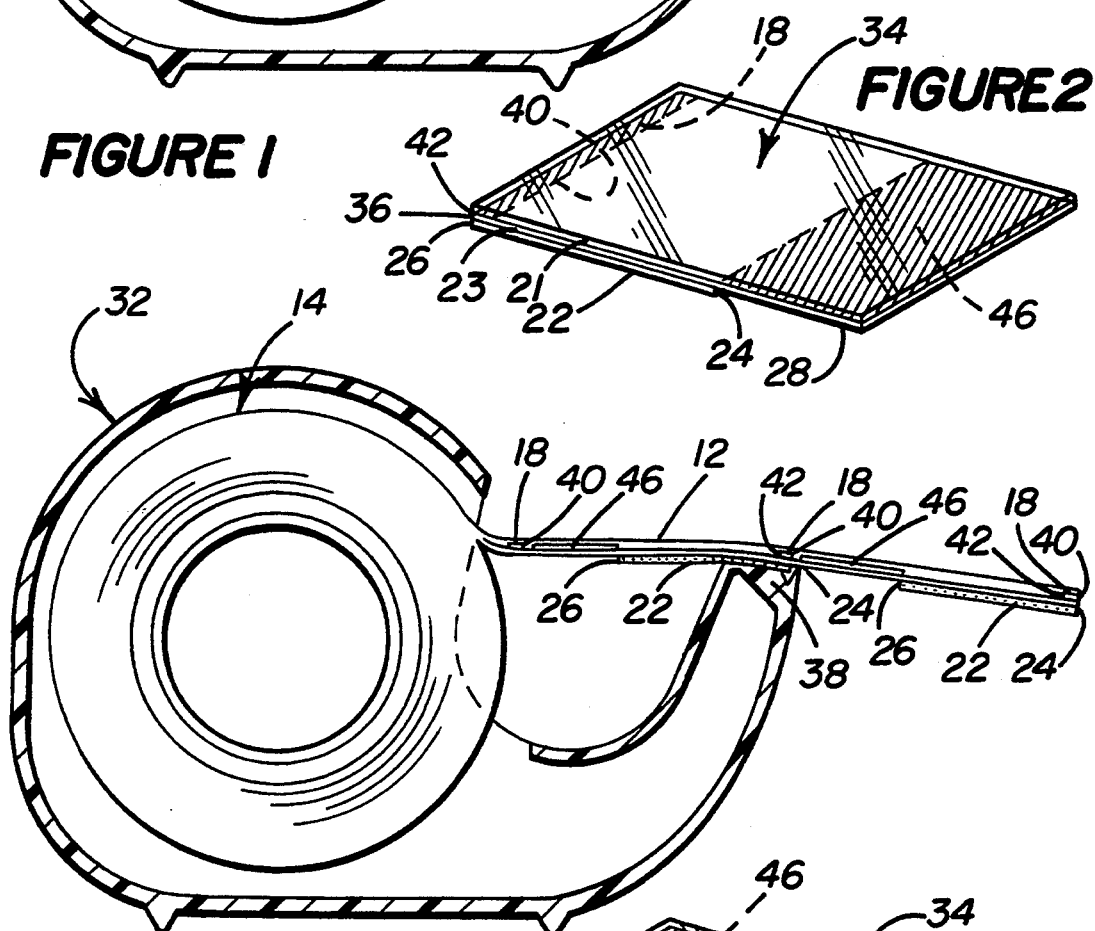
FIGURE 3
FIGURE 4

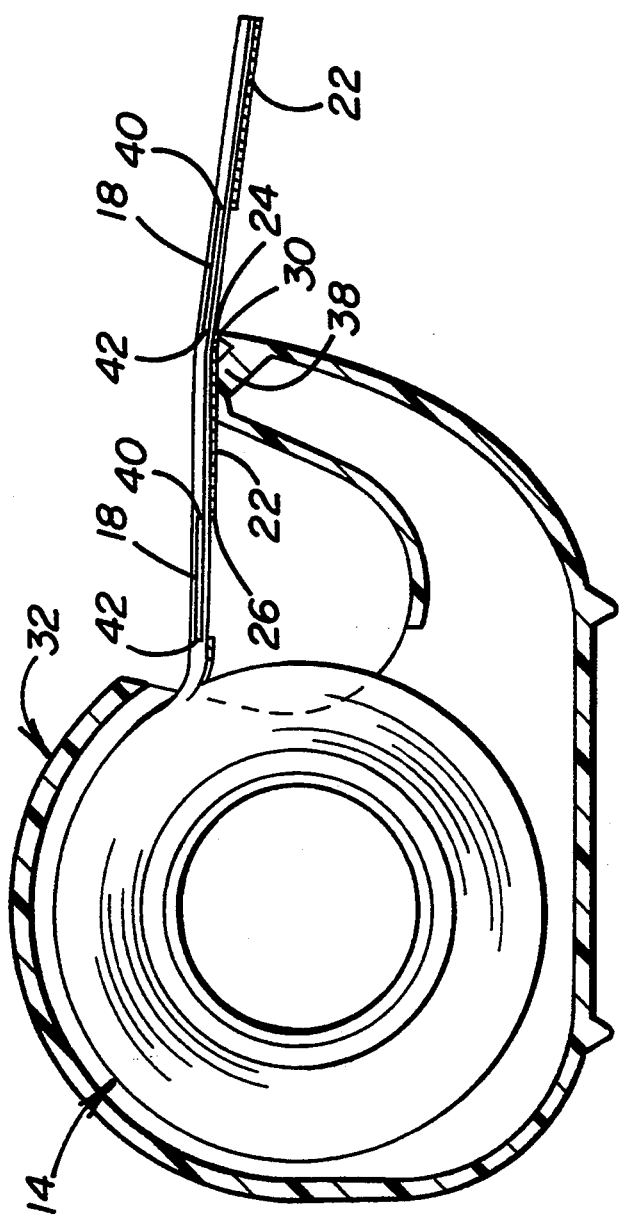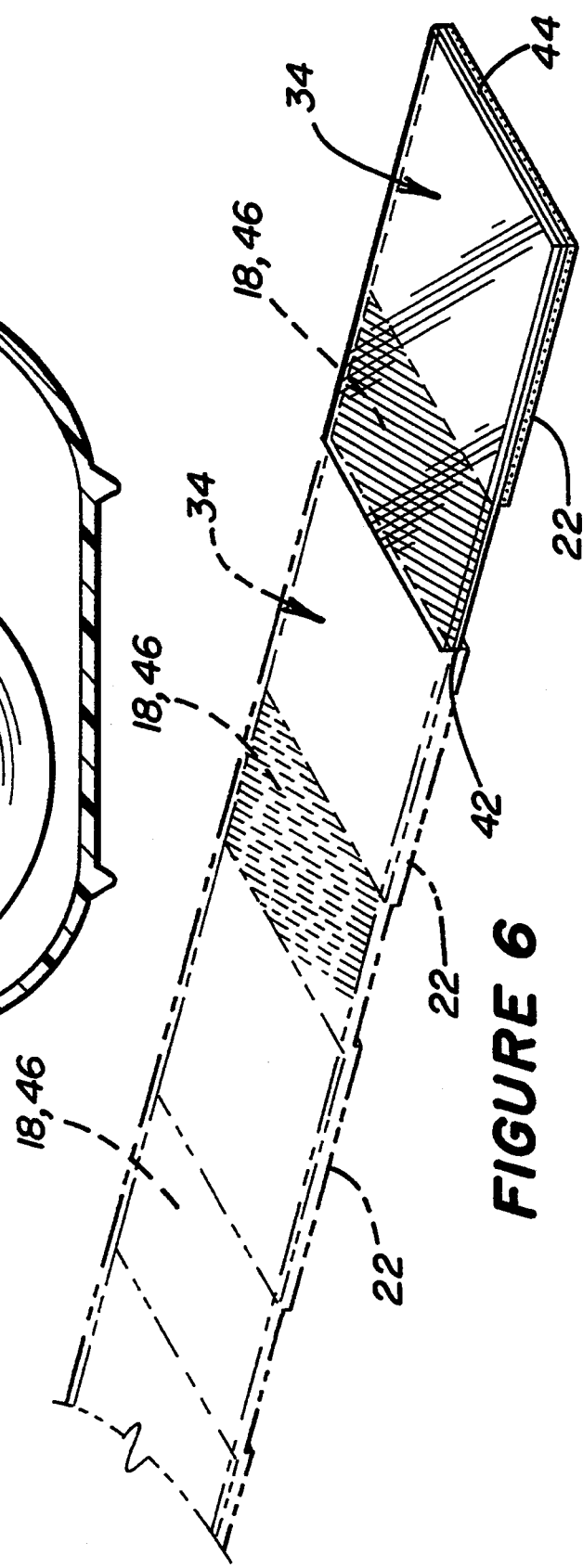

5,370,916

TAPE DISPENSING SYSTEM

TECHNICAL FIELD

The present invention relates to an adhesive tape product which is adapted to be cut off into a plurality of tape segments of a selectable length, which tape segments are characterized by having a low tack adhesive along one edge. The segments are of a nature such that they are useful for attachment to papers where they can serve as flags.

BACKGROUND OF THE INVENTION

A number of years ago 3M Company introduced its "Post-it" (trademark of 3M Company) product which consists of a pad of individual pieces of paper each having a band of low tack pressure sensitive adhesive along one edge. Basically, the pack is held together by the adhesive and the user simply peels off each one of the pieces of paper as they are needed. The low tack adhesive can then be attached to a document by contact and by pressure from the attacher's thumb. The pieces of paper can be written upon if desired. They can also be readily removed without damaging the document. Often these pieces of paper or flags are attached to the edges of sheets of paper which are in a stack with other sheets of paper (and may be bound together as are the pages of a book or magazine) and with all or part of the non-adhesive portion of the flag extending outwardly from the stack of sheets of paper so that they can call attention to the need to refer to the particular sheet of paper.

More recently, a similar product has been introduced to the market, also by 3M Company, which utilizes sufficiently transparent plastic tape so that one can read material through the tape when it is attached over the material rather than paper, but which, like the paper flags, has a low tack adhesive along one of its edges. The surfaces of the plastic tape segments may be roughened so as to provide the ability to write on them. Furthermore, relatively brightly colored stripes have been provided on the portions of the flags which do not have an adhesive on them so that they are more readily visible when they stick out from stacked papers.

Note that the commercial "Post-it" type flags are dispensed from dispensers wherein the adhesive on a first of the flags is attached to the non-adhesive side of the next of the flags in a manner which requires considerable assembly. Furthermore, the most readily available size of packets of the prior art "Post-it" tape flags contain only fifty such tags, perhaps because of difficulty in assembling larger packages utilizing the complicated dispensing system.

Both of the products discussed above consist of a plurality of individual tape segments attached to one another. In the case of the paper flags they are simply attached to one another with the adhesive band for each successive tape segment being attached to the non-adhesive covered side of the next segment and with the adhesive bands being in alignment with one another so as to provide a pad of removable labelling segments. In the case of the transparent plastic flags they are also stuck to one another and are provided in a dispenser which dispenses one of the flags at a time, each tape as it is removed from the dispenser pulling the next tape partially out of the dispenser.

It would be advantageous if, particularly in the case of the plastic flags, one could provide a product which could be sold in roll form and from which individual flags could be cut off and used in the manner described above. This would allow the use of relatively inexpensive dispensers, much like those utilized by 3M Company to market its "Scotch" (trademark of 3M Company) brand plastic tape.

While some systems do exist for allowing segments of tape of a desired length to be torn off of a larger roll of the tape, such are not readily adapted to cut off and deliver flags of the nature discussed above. For example, Dashow, U.S. Pat. No. 4,161,249, discloses a web product, for example an adhesive product, on which is provided markings at predetermined locations to aid a user in dispensing the product. The product is wound into a roll and a marker is secured to the web along at least one predetermined location extending transversely across the width of the web. The web can be unwound to expose the marker which signifies to a user that a predetermined portion of the length of the web has been unwound. Other patents of interest include U.S. Pat. No. 2,170,147 of Lane, issued Aug. 22, 1939; U.S. Pat. No. 2,780,352 of Schroeder, issued Feb. 5, 1957; U.S. Pat. No. 2,818,349 of Bergstedt, issued Dec. 31, 1957; U.S. Pat. No. 3,648,835 of Yucel, issued Mar. 14, 1972 and U.S. Pat. No. 4,562,102 of Rabuse, issued Dec. 31, 1985.

It should be noted that none of the above patents contemplate use of adhesive only along portions of the tape or any correlation of the location of bands of adhesive with indicator stripes.

The present invention is directed to providing a tape product from which flags can be torn off and used as described above.

DISCLOSURE OF INVENTION

In accordance with an embodiment of the present invention a longitudinally extending adhesive tape product is set forth which is adapted to be cut off into a plurality of tape segments each of which has a pair of longitudinally edges extending along the longitudinal extension of the tape product and a pair of transverse edges extending transversely to the longitudinal extension of the tape product by use of a cutting edge defined by a cutting edge support on a tape dispenser, the cutting edge extending generally transversely across the tape product. The product comprises a longitudinally extending tape wound into a roll. The tape has a first side which is adhesive free. The tape has a plurality of longitudinally separated indicia. The second side of the tape has a corresponding plurality of longitudinally separated and transversely extending coating bands of pressure sensitive adhesive, the coating bands having leading and trailing edges transverse of the tape and being separated by portions of the second side of the tape which are substantially adhesive free. The indicia are so located relative to the coating bands whereby when one of the indicia is aligned in a specified relation to the transverse cutting edge on the tape dispenser and a tape segment is cut off using the cutting edge, the cut off tape segment has a single one of the coating bands and the coating band is located adjacent a transverse edge of the tape segment.

An adhesive tape product as set forth above has the advantage that it can be mounted to a conventional tape dispenser, and, on an as needed basis individual tape segments or flags can be torn off and used. Thus, the need for expensive special packaging is virtually eliminated as is the expense of cutting the tape into preset flag sizes and packaging such tape segments or flags.

In accordance with another embodiment of the present invention a method is set forth of cutting off a plurality of tape segments from a longitudinally extending tape in such a manner that each resulting cut off segment has a pair of longitudinal edges extending along the longitudinal extension of the tape and a pair of transverse edges extending transversely to the longitudinal direction of the tape. The tape has a first side which is adhesive free, a plurality of longitudinally separated indicia, and a second side which has a corresponding plurality of longitudinally separated and transversely extending coating bands of pressure sensitive adhesive. The coating bands have leading and trailing edges transverse of the tape and are separated by portions of the second side of the tape which are substantially adhesive free. The method comprises utilizing a tape wherein the indicia are so located relative to the coating bands whereby when one of the indicia is aligned in a specified relation to a transverse cutting edge and a tape segment is cut off using the cutting edge, the cut off tape segment has a single one of the coating bands and the coating band is located adjacent a transverse edge of the tape segment. The tape is fed until one of the indicia is aligned in the specified relation to the transverse cutting edge. A tape segment is cut off using the cutting edge.

BRIEF DESCRIPTION OF THE DRAWINGS

The present invention will be better understood by reference to the figures of the drawings wherein like numbers denote like parts throughout and wherein:

FIG. 1 illustrates, in side sectional view, a tape dispenser loaded with a tape product in accordance with an embodiment of the present invention;

FIG. 2 illustrates, in perspective, a tape segment obtainable using the arrangement of FIG. 1;

FIG. 3 illustrates, in a view similar to FIG. 1, another embodiment in accordance with the present invention;

FIG. 4 illustrates, in a view similar to FIG. 2, a tape segment obtainable utilizing the arrangement of FIG. 3;

FIG. 5 illustrates, in a view similar to FIG. 1, yet another embodiment in accordance with the present invention;

FIG. 6 illustrates, in a view similar to FIG. 2, a tape segment utilizing an arrangement as shown in FIG. 5.

BEST MODE FOR CARRYING OUT INVENTION

Figure 7:
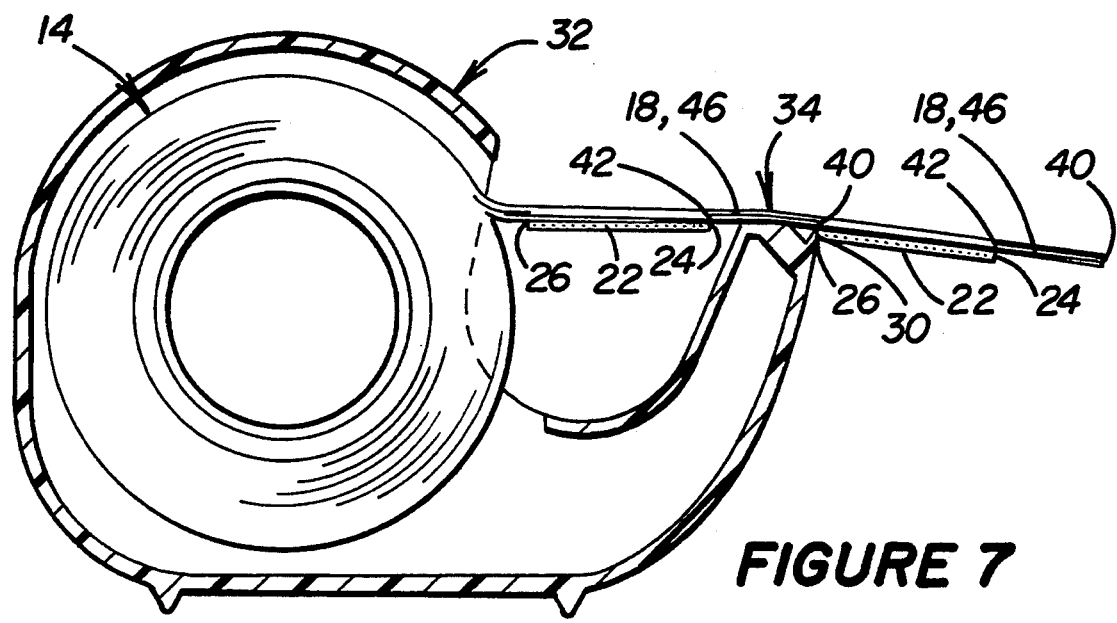
FIG. 7 illustrates, in a view similar to FIG. 1, a different embodiment yet in accordance with the present invention.
Figure 8:
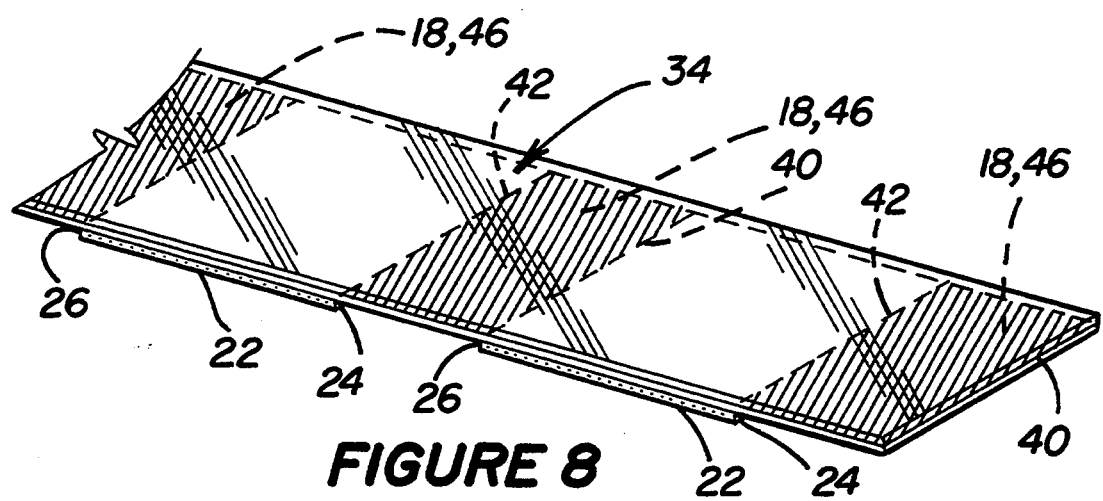
FIG. 8 illustrates, in a view similar to FIG. 2, a tape segment utilizing an arrangement as shown in FIG. 7.

A longitudinally extending adhesive tape product in accordance with an embodiment of the present invention is illustrated in FIG. 1. In the embodiment illustrated in FIG. 1 the adhesive tape product is in the nature of a longitudinally extending tape 12 which is wound into a roll 14. The tape 12 has a first side 16 which is adhesive free. The tape 12 also has a plurality of longitudinally separated indicia 18. In the particular embodiment illustrated the indicia is in the nature of a stripe 19 between two layers 21 and 23 which together form the tape 12. However, the indicia 18 can be in the nature of a line, one or more dots, an arrowhead, or whatever the designer desires. In the embodiment illustrated the first side 16 of the tape 12 faces upwardly. If the tape 12 is made of paper the first side 16 will be adapted to be written upon. If the tape 12 is made of transparent plastic material it can suitably have a matte finish whereby it can also be written upon.

The tape 12 has a second side 20 which faces downwardly in the embodiment shown in FIG. 1. The second side 20 has a plurality of longitudinally separated and transversely extending coating bands 22 with the coating bands 22 being in corresponding relation to the indicia 18. Note that it is possible to have more than one of the indicia 18 for all or some of the coating bands 22. There will still be a correspondence, however; there will simply be additional not necessarily corresponding indicia. At least one of the indicia 18 must be positioned relative to the band 22 in at least one of the manners discussed below.

The coating bands 22 have leading edges 24 and trailing edges 26 with the term "leading" being used to denote towards the free end of the tape 12. The leading edge 24 and the trailing edge 26 are transverse of the tape 12 and are separated by portions 28 of the second side 20 of the tape which are substantially adhesive free.

The indicia 18 are so located relative to the coating bands 22 whereby when one of the indicia 18 is aligned in a specified relation to a transverse cutting edge 30 on a tape dispenser 32 of a size such as to be held in the users hand and a tape segment 34 (see FIG. 2) is cut off using the cutting edge 30, the cut off tape segment 34 has a single one of the coating bands 22 and the coating band 22 is located adjacent a trailing transverse edge 36 of the tape segment 34. A larger and heavier desk top tape dispenser (not shown) can be used in place of the illustrated tape dispenser 32.

Figure 9:
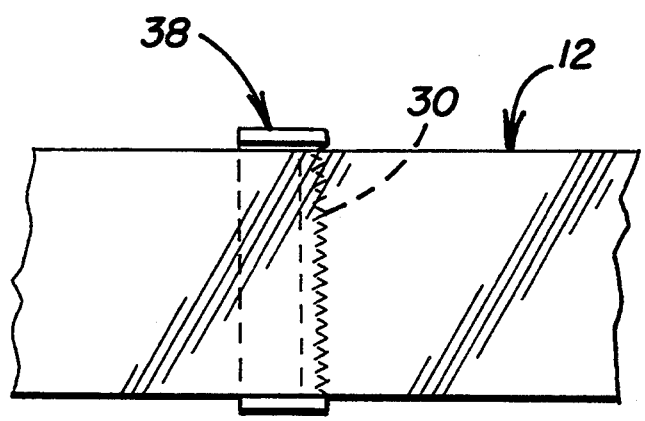
FIG. 9 illustrates in partial plan view a detail in the structure of the arrangements shown in FIGS. 1, 3, 5 and 7.

Reference to FIG. 9 (the indicia 18 and the coating bands 22 are omitted for clarity of illustration) shows the cutting edge 30 as defined by a cutting edge support 38 on the tape dispenser 32. As will be noted the cutting edge 30 extends generally transversely across the tape 12. It should be noted that the cutting edge 30 can be an edge on the cutting edge support 38 or can be, for example, a blade held in place by the cutting edge support 38.

Generally the adhesive will be of the low tack variety, i.e., of the same type as is utilized on the aforementioned "Post-it" product of 3M Company.

In accordance with the particular embodiments illustrated each of the indicia 18 is in the nature of an indicator stripe generally transverse of the tape. The indicator stripe indicia 18 have leading edges 40 and trailing edges 42 generally transverse of the tape 12. If either the leading edge 42 of the stripe 18 is aligned substantially with the leading edge 24 of one of the coating bands 22 or the trailing edge 42 of the stripe 18 is aligned substantially with the trailing edge 26 of one of the coating bands 22, the resulting tape segment 34, on tearing off the tape 12 respectively along the leading edge 40 of the stripe 18 or along the trailing edge 42 of the stripe 18, has both the stripe 18 and the coating band 22 along the same transverse edge. If either the leading edge 40 of the stripe 18 is aligned with the trailing edge 26 of one of the coating bands 22 or the trailing edge 42 of the stripe 18 is aligned with the leading edge 24 of one of the coating bands 22, the resulting tape segment 34, on tearing off the tape 12 respectively along the leading edge 40 of the stripe 18 or along the trailing edge 42 of the stripe 18, has the stripe 18 on an opposite edge from the coating band 22.

FIG. 1 illustrates the embodiment wherein the trailing edge 42 of the indicator stripe 18 is aligned with the trailing edge 26 of the coating band 22 whereby the resulting tape segment 34, as seen in FIG. 2, has the coating band 22 at the trailing transverse end 36 of the tape segment 34 as is the indicator stripe 18.

The embodiment of FIG. 3 illustrates the situation wherein the leading edge 40 of the indicator stripe 18 is aligned with the leading edge 24 of the coating band 22 whereby, when the tape 12 is cut off by the cutting edge 30, the resulting tape segments 34, as seen in FIG. 4, has the coating band 18 at the same leading transverse end 44 of the tape segment 34 as is the indicator stripe 18.

In the embodiment of FIG. 1 the coating band 22 hangs out past the cutting edge 30 and thus does not temporarily attach to the cutting edge support 38 whereby it is generally necessary for the user to press down with a finger or thumb upon the tape 12 just behind the trailing edge 42 of the indicator stripe 18.

In the embodiment of FIG. 3 the coating band 22 is in contact with and therefore adheres to the cutting edge support 38 sufficiently so as to hold the tape 12 in proper position for cutting off of the tape segment 34. This can be advantageous in allowing the user to accurately cut off a tape segment 34 using only one hand. It is also advantageous in that the next potential tape segment 34 is positioned for ready grasping and pulling forward into position for cutting.

In both the embodiments of FIGS. 1 and 3 additional indicator stripes 46 are present so as to provide an indicator stripe 46 which is at the opposite end of the segment 34 from the coating band 22. This can be advantageous in that it may be desirable to have a colored indicator stripe 46 visible when the tape segment 34 is utilized to flag portions of manuscripts and the like. The coating band 22 can, as in the commercial plastic flags marketed by 3M Company, extend up to the colored indicator stripe 46. The colored indicator stripe 46, like the indicia 18, can be formed between the layers 21 and 23 which together form the tape 12.

FIG. 5 illustrates an arrangement utilizing another embodiment of the longitudinally extending adhesive tape product 10 of the present invention. In the embodiment shown in FIG. 5 each of the indicia 18 is an indicator stripe which is generally transverse of the tape 12 and which has a leading edge 40 and a trailing edge 42 generally transverse of the tape 12. In the embodiment of FIG. 5 the trailing edge 42 of the indicator stripe 18 is aligned substantially with the leading edge 24 of one of the coating bands 22. In this arrangement if the tape 12 is positioned with the trailing edge 42 of the indicator stripe 18 (and therefore also with the leading edge 24 of the coating band 22) along the cutting edge 30 of the tape dispenser 32, the resulting tape segment 34, as illustrated in FIG. 6, will have the coating band 22 at an opposite end 44 of the tape segment 34 from the indicator stripe 18. Thus, a single indicator stripe 18 can serve both to indicate how to align the tape 12 for tearing off of tape segments 34 and to provide a flag, i.e., to serve the same purpose as does the colored indicator stripes 46 of the embodiments of FIGS. 1–4.

In the embodiment of FIG. 5 it will be noted that the coating band 22 is aligned such that when the coating stripe 18 is aligned in the specified relation to the cutting edge 30, one of the cutting bands 22 adheres to the cutting edge support 38 sufficiently so as to hold the tape 12 in proper position for cutting off of the tape segment 34. An advantage of the embodiment of FIG. 5 is that the resulting tape segment 34 has the indicator stripe 18 at an opposite end of the tape segment 34 from the coating band 22 whereby if the tape segment 34 is used as a flag the indicator stripe 18 can be positioned to project outwardly from one paper in a stack of papers and thereby be particularly visible. The indicator stripe 18 can, for example, be of some bright color so as to be readily visible. It is also advantageous in that the next potential tape segment 34 is positioned for ready grasping and pulling forward into position for cutting off.

FIG. 7 illustrates an embodiment wherein the leading edge 40 of the indicator stripe 18 is aligned with the trailing edge 26 of the coating band 22. As with the embodiment of FIG. 5, the tape segment 34 obtained by aligning the requisite edge (in this case the leading edge 40 of the indicator stripe 18) with the cutting edge 30 and tearing off the tape segment 34, has the indicator stripe 18 at an opposite end of the tape segment 34 from the coating band 22. As with the embodiment of FIG. 5, the indicator stripe 18 can also serve the purpose of the colored indicator stripe 46 mentioned with respect to the embodiments illustrated in FIGS. 1–4.

Note that the widths of the indicator stripe 18 (or the colored indicator stripe 46, if present) and of the coating band 22 can be any convenient width. The current commercial "Post-it" tape flags have adhesive coating bands 22 which extend approximately two-thirds of the length of the tape segment 34 while the indicator stripes 18 of this product extends the entire (approximately one-third) remainder of the length of the tape segment 34.

In operation the tape 12, in any embodiment of the invention, is advanced from the roll 14 until a first of the segments 34 which is to be cut off is aligned as required with the cutting edge 30. Then the tape segment 34 is cut off from the tape 12 utilizing the cutting edge 30. The tape segment 34 can then be attached and used in the same manner as are prior art precut tape segments. The tape roll 14 can be sold in combination with the tape dispenser 32. Also, if the tape dispenser 32 is of a construction such that it can be separated and such that additional roll 14 can be mounted on it then the tape rolls 14 can be marketed as replacements.

Industrial Applicability

The present invention provides tape product 10 suitable for producing a plurality of flags or tape segments 34 which can be attached, with or without messages, so as to aid in locating portions of manuscripts or the like.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A longitudinally extending adhesive tape wound into a roll, and mounted on a tape dispenser having a transverse cutting edge supported by a cutting edge support, the tape being unwindable progressively from the roll so as to be cut off into a plurality of tape segments, each of which has a pair of longitudinal edges extending along the longitudinal extension of the tape and a pair of transverse edges extending transversely to the longitudinal extension of the tape, the roll is mounted on the tape dispenser in such a manner that the cutting edge extends generally transversely across the tape, the tape comprising:

a first side which is adhesive free;

a plurality of longitudinally separated indicia positioned longitudinally along the tape; and a second side which has a plurality of longitudinally separated and transversely extending coating bands of low tack pressure sensitive adhesive, the coating bands being in corresponding relation to the indicia, the coating bands having leading and trailing edges transverse of the tape and being separated by portions of the second side of the tape which are substantially adhesive free;

the indicia being so located relative to the coating bands such that one of the indicia is aligned to the transverse cutting edge on the tape dispenser and a tape segment is cut off using the cutting edge, the cut off tape segment has a single one of the coating bands, the coating band on the cut off tape segment being located adjacent to a transverse edge of the tape segment.

2. A product as set forth in claim 1, further characterized in that the coating bands are so located relative to the indicia such that one of the indicia is aligned in the specified relation to the cutting edge, one of the coating bands adheres to the cutting edge support sufficiently so as to hold the tape in proper position for cutting off of the tape segment.

3. A product as set forth in claim 2, wherein the first side of the tape is adapted to be written upon.

4. A product as set forth in claim 3, wherein the tape is made of a plastic material or of paper.

5. A product as set forth in claim 1, wherein each of said indicia is an indicator stripe generally transverse of the tape and having leading and trailing edges generally transverse of the tape and wherein either 1) the leading edge of the stripe is aligned substantially with the leading edge of one of the coating bands or 2) the trailing edge of the stripe is aligned substantially with the trailing edge of one of the coating bands such that the tape is positioned with the aligned edges of the stripe and of the coating band along the cutting edge and the tape is cut by the cutting edge, the resulting tape segment will have the coating band at the same end of the tape segment as is the indicator stripe.

6. A product as set forth in claim 1, wherein each of said indicia is an indicator stripe generally transverse of the tape and having leading and trailing edges generally transverse of the tape and wherein the trailing edge of the stripe is aligned substantially with the leading edge of one of the coating bands such that the tape is positioned with the trailing edge of the stripe and the leading edge of the coating band both along the cutting edge and the tape is cut by the cutting edge the resulting tape segment will have the coating band at an opposite end of the tape segment from the indicator stripe.

7. A method of cutting off a plurality of tape segments from a longitudinally extending tape in such a manner that each resulting cut off segment has a pair of longitudinal edges extending along the longitudinal extension of the tape and a pair of transverse edges extending transversely to the longitudinal direction of the tape, the tape having a first side which is adhesive free, a plurality of longitudinally separated indicia which are positioned longitudinally along the tape, and a second side which has a plurality of longitudinally separated and transversely extending coating bands of low tack pressure sensitive adhesive, the coating bands being in corresponding relation to the indicia, the coating bands having leading and trailing edges transverse of the tape and being separated by portions of the second side of the tape which are substantially adhesive free, the method comprising:

utilizing a tape mounted on a dispenser having a transverse cutting edge wherein the indicia are so located relative to the low tack pressure sensitive adhesive coating bands such that one of the indicia is aligned at said transverse cutting edge and a tape segment is cut off using the cutting edge, the cut off tape segment has a single one of the coating bands which is located adjacent to a transverse edge of the tape segment;

feeding the tape until one of the indicia is aligned at said transverse cutting edge; and cutting off a tape segment using the cutting edge.

* * * * *